United States Patent
Lu

(10) Patent No.: US 8,630,099 B2
(45) Date of Patent: Jan. 14, 2014

(54) ELECTRONIC DEVICE HAVING LEVER WITH PRECISION PIVOT

(75) Inventor: Hung-Chun Lu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 336 days.

(21) Appl. No.: 13/220,703

(22) Filed: Aug. 30, 2011

(65) Prior Publication Data
US 2013/0003337 A1    Jan. 3, 2013

(51) Int. Cl.
*H05K 7/14*    (2006.01)
(52) U.S. Cl.
USPC ............... 361/802; 361/801; 361/807
(58) Field of Classification Search
USPC .......................... 361/807, 801, 802
See application file for complete search history.

(56) References Cited

U.S. PATENT DOCUMENTS

| 4,104,491 A * | 8/1978 | Duble .................. 200/50.15 |
| 5,082,387 A * | 1/1992 | DeVries ................ 403/146 |
| 2009/0016011 A1 * | 1/2009 | Wade .................... 361/684 |

* cited by examiner

*Primary Examiner* — Forrest M Phillips
(74) *Attorney, Agent, or Firm* — Altis Law Group, Inc.

(57) ABSTRACT

An exemplary electronic device includes a housing, a lever, and a locking device securing the lever on the housing. The housing includes a bottom plate, a top plate and a side plate connecting the bottom plate with the top plate. The locking device includes a nut having a main body extending downwardly into the lever, a screw extending upwardly through the top plate into the nut, and gaskets sandwiched between the top plate and the nut. The lever is disposed on the top plate and sleeved on the nut with a gap defined between a top face of the lever and a bottom face of a head of the nut. A polytetrafluoroethylene paste is provided on an interface between the nut and the screw.

20 Claims, 3 Drawing Sheets

ELECTRONIC DEVICE HAVING LEVER WITH PRECISION PIVOT

BACKGROUND

1. Technical Field

The present disclosure relates to electronic devices, and more particularly, to an electronic device having a lever.

2. Description of Related Art

Storage Bridge Bay (SBB) canisters are widely used for providing standard mechanical/electrical interfaces between passive backplane drive arrays and electronic packages. An SBB canister includes a housing receiving electronic elements, and a pair of levers attached on the housing. The levers are pivotable about the housing between an open position in which the SBB canister can be inserted into an enclosure and a closed position in which the SBB canister is fixed within the enclosure by locking the levers with the enclosure. Generally, each lever is attached to the housing by extending a rivet through the lever and the housing and then punching the rivet to deform ends of the rivet. However, this fixing method may result in the levers and the housing being too tightly held to each other by the rivets. When this happens, it is difficult to rotate the levers about the housing. This problem hinders normal assembly of the SBB canister to the enclosure.

What is needed, therefore, is an electronic device having a lever which can overcome the limitations described above.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
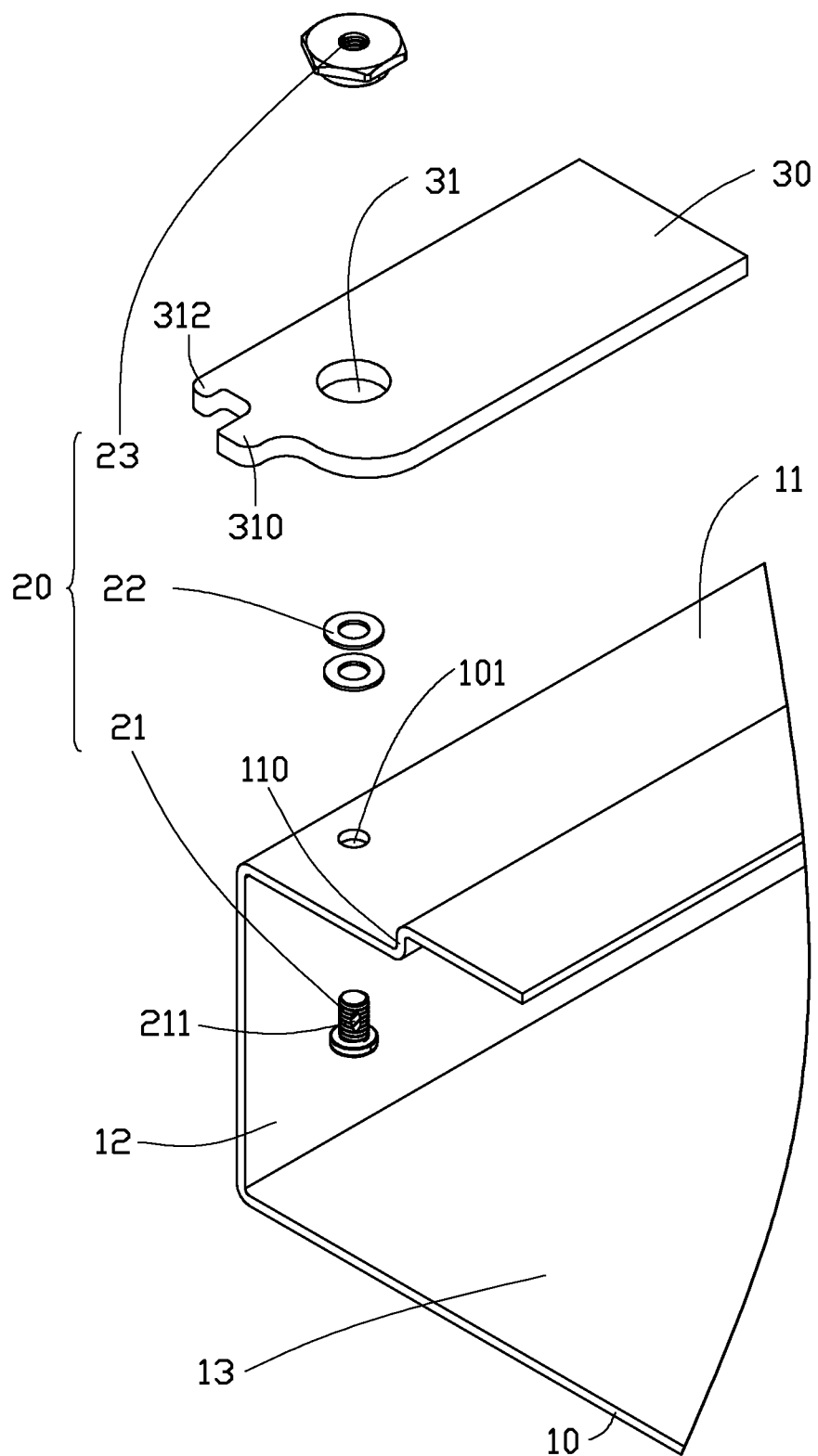
FIG. 1 is an isometric, exploded view of a part of an SBB (Storage Bridge Bay) canister of an embodiment of the present disclosure.

Referring to FIG. 1, an SBB (Storage Bridge Bay) canister in accordance with an embodiment of the present disclosure is shown. The SBB canister includes a housing 10, a lever 30, and a locking device 20 pivotably fixing the lever 30 on the housing 10.

The housing 10 is made of metal or other strong material. The housing 10 includes a bottom plate 13, a side plate 12 extending upwardly and perpendicularly from a lateral side of the bottom plate 13, and a top plate 11 extending horizontally and perpendicularly from a top side of the side plate 12. The top plate 11 forms a step 110 at a middle portion thereof. The step 110 is for blocking the lever 30, and thus preventing the lever 30 from over-rotating. The top plate 11 defines an aperture 101 next to the top side of the side plate 12.

The lever 30 is made of a rigid material such as metal. The lever 30 forms a first cam 310 and a second cam 312 at an end thereof. The first cam 310 and the second cam 312 are adjacent to each other. The lever 30 defines a hole 31 neighboring the first cam 310 and the second cam 312, for extension of the locking device 20 through the lever 30. The hole 31 has a diameter larger than that of the aperture 101.

Figure 2:
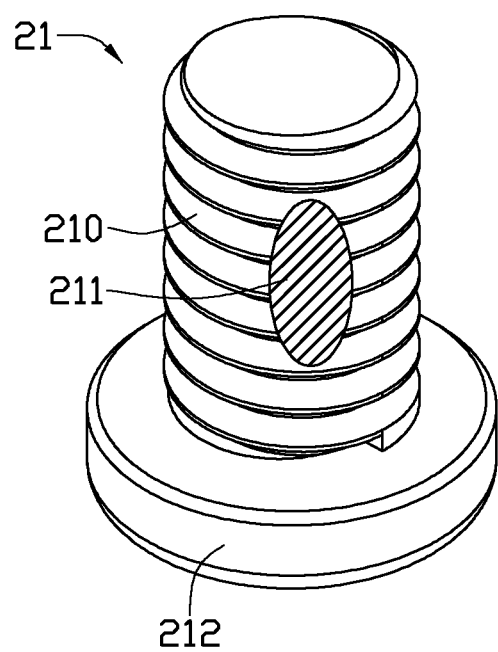
FIG. 2 is an enlarged view of a screw of the SBB canister of FIG. 1.
Figure 3:
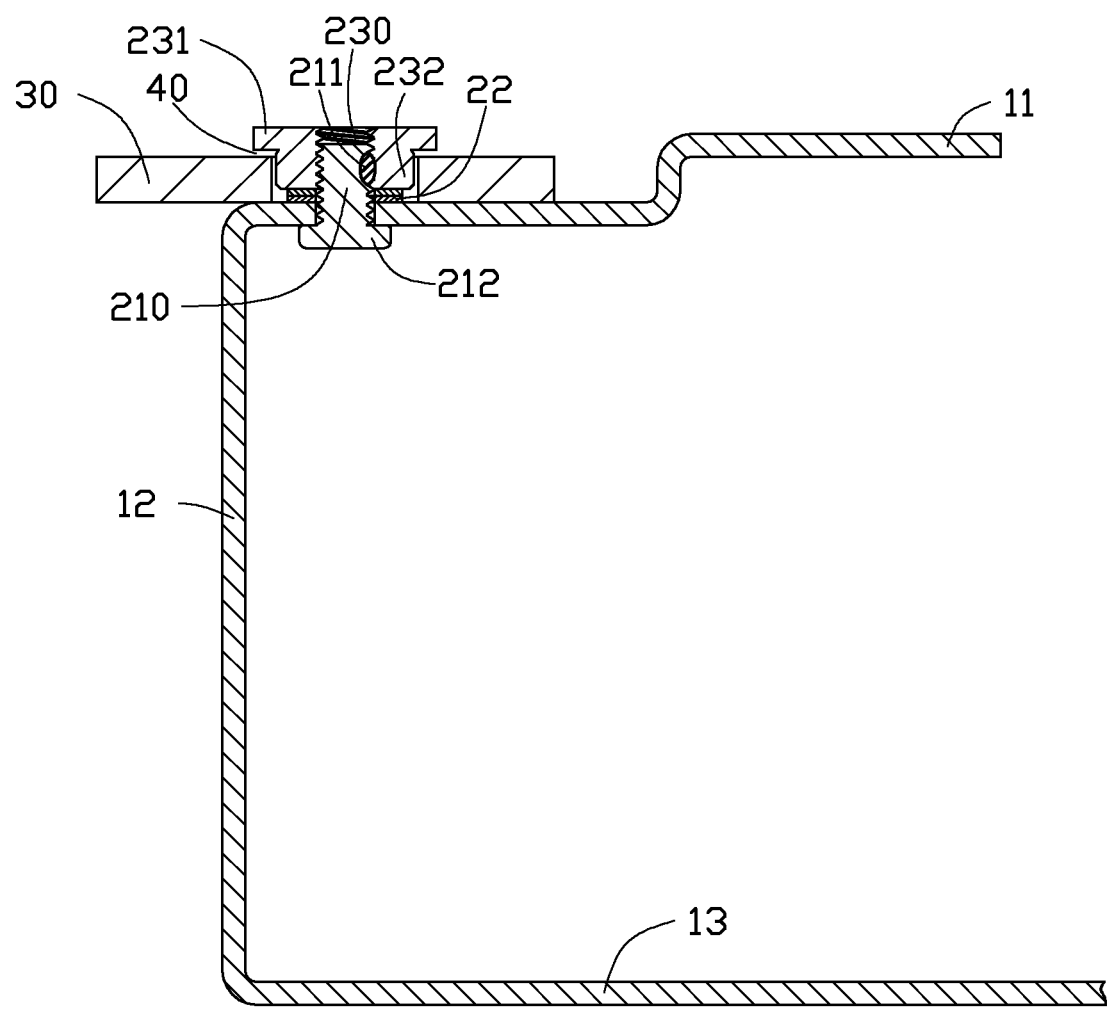
FIG. 3 is a cross-section of the SBB canister of FIG. 1 when the SBB canister is assembled.

Also referring to FIGS. 2-3, the locking device 20 includes a screw 21, a nut 23, and two gaskets 22 located between the screw 21 and the nut 23. The screw 21 extends through the aperture 101 of the top plate 11 from below the top plate 11. A head 212 of the screw 21 abuts against a bottom face of the top plate 11, and a pole 210 of the screw 21 extends through the aperture 101 and is exposed above the top plate 11. The head 212 of the screw 21 has an outer diameter larger than that of the pole 210. The nut 23 is extended into the hole 31 of the lever 30 from above the lever 30. A head 231 of the nut 23 is located above and spaced by a gap 40 from the lever 30, and a main body 232 of the nut 23 is substantially fully received within the hole 31 of the lever 30. The main body 232 of the nut 23 has an outer diameter smaller than that of the head 231 of the nut 23, and larger than that of the pole 210 of the screw 21. The nut 23 defines a screw hole 230 extending from a top to a bottom thereof. The screw 21 is threadedly fixed to the nut 23 by extending the pole 210 of the screw 21 into the screw hole 230 of the nut 23. A Teflon® (polytetrafluoroethylene) paste 211 is adhered on a part of a circumferential surface of the pole 210 of the screw 21 before the pole 210 of the screw 21 is extended into the nut 23. The Teflon® paste 211 is used to increase a friction force between the pole 210 of the screw 21 and the nut 23, so that the screw 21 can be reliably and firmly fixed into the nut 23. The Teflon® paste 211 may be made from a mixture of diethylene glycol dimethacrylate and mequinol, a mixture of urethane methacrylate resin, hydroxyalkyl methacrylate, acrylic acid, and cumene hydroperoxide, a mixture of 2-hydroxyethyl methacrylate, aromatic dimethylacrylate, and cumene hydroperoxide, and so on.

The gaskets 22 are sandwiched between a bottom face of the main body 232 of the nut 23 and a top face of the top plate 11. Each gasket 22 has a thickness smaller than that of the lever 30. The gaskets 22 are sleeved on the pole 210 of the screw 21 and stacked one on the other. By controlling a number of the gaskets 22, a distance between the bottom face of the head 231 of the nut 23 and the top face of the top plate 11 can be varied. However, in order to retain the gap 40 for free rotation of the lever 30 about the locking device 20, the distance between the bottom face of the head 231 of the nut 23 and the top face of the top plate 11 should be kept larger than a thickness of the lever 30. In other words, with the provision of the gap 40, the lever is slightly movable along a top-to-bottom direction of the locking device 20. With the above-described configuration, the lever 30 retained between the nut 23 and the top plate 11 is freely rotatable about the locking device 20 without being too tightly pressed by the nut 23. If a thicker lever 30 is used, more gaskets 22 are required for retaining the gap 40 between the bottom face of the head 231 of the nut 23 and the lever 30. In one situation, no gasket 22 is required if the lever 30 is thin enough.

Since the Teflon® paste 211 is used on an interface between the nut 23 and the screw 21, the screw 21 can be tightly fixed into the nut 23 with little or no risk of loosening later on. Therefore, the lever 30 can be reliably confined between the nut 23 and the top plate 11.

It is believed that the present embodiments will be understood from the foregoing description, and it will be apparent that various changes may be made thereto without departing from the spirit and scope of the present disclosure or sacrificing all of its material advantages, the examples hereinbefore described merely being preferred or exemplary embodiments.

What is claimed is:

1. An electronic device comprising:
   a housing comprising a plate;
   a lever disposed on the plate; and
   a locking device comprising:
      a nut downwardly inserted into the lever;
      a gasket sandwiched between the nut and the plate;
      a screw upwardly extending through the plate into the nut; and
      a polytetrafluoroethylene paste provided at an interface between the screw and the nut;
   wherein the lever is sleeved on the nut and confined between the nut and the top plate;
   wherein a gap is defined between the nut and a top face of the lever so that the lever is slightly movable along a top-to-bottom direction of the locking device and rotatable about locking device; and
   wherein the gasket is received within and surrounded by the lever.

2. The electronic device of claim 1, wherein a plurality of gaskets are sandwiched between the nut and the top plate, the number of gaskets being proportional to a thickness of the lever.

3. The electronic device of claim 2, wherein the number of gaskets is directly proportional to the thickness of the lever.

4. The electronic device of claim 1, wherein the nut comprises a head and a main body extending downwardly from the head, the lever being sleeved on the main body of the nut.

5. The electronic device of claim 4, wherein the head of the nut has an outer diameter larger than that of the main body of the nut.

6. The electronic device of claim 4, wherein the gap is defined between a bottom face of the head of the nut and the top face of the lever.

7. The electronic device of claim 4, wherein the lever has a thickness smaller than a distance between a bottom face of the head of the nut and the top face of the plate.

8. The electronic device of claim 4, wherein the screw comprises a head and a pole extending upwardly from the head, the pole of the screw having an outer diameter smaller than that of the main body of the nut.

9. The electronic device of claim 8, wherein the polytetrafluoroethylene paste is attached on an outer circumferential face of the pole of the screw.

10. The electronic device of claim 8, wherein the head of the screw abuts against a bottom face of the plate.

11. The electronic device of claim 8, wherein the pole of the screw extends through the plate and is threadedly fixed into the main body of the nut.

12. The electronic device of claim 1, wherein the electronic device is a storage bridge bay canister.

13. The electronic device of claim 4, wherein an outer diameter of the gasket is less than an outer diameter of the main body of the nut.

14. An electronic device comprising:
   a housing comprising a plate;
   a lever disposed on the plate; and
   a locking device comprising:
      a nut comprising a head and a main body, the main body extending downwardly into the lever;
      a gasket sandwiched between the main body of the nut and the plate;
      a screw extending upwardly through the plate into the main body of the nut; and
      a polytetrafluoroethylene paste being provided at an interface where the nut contacts the screw;
   wherein an end of the lever is confined between the head of the nut and the top plate;
   wherein a distance between a top face of the plate and a bottom face of the head of the nut is larger than a thickness of the end of the lever so that the lever is freely rotatable about the main body of the nut; and
   wherein the gasket is received within and surrounded by the lever.

15. The electronic device of claim 14, wherein a plurality of gaskets are sandwiched between the main body of the nut and the plate.

16. The electronic device of claim 14, wherein a number of the gaskets is in direct ratio to the thickness of the lever.

17. The electronic device of claim 15, wherein each of the gaskets has a thickness smaller than that of the lever.

18. The electronic device of claim 14, wherein the screw comprises a head and a pole extending upwardly from the head, the pole of the screw being extending through the plate and fixed within the nut, and the head of the screw abutting against a bottom face of the plate.

19. The electronic device of claim 18, wherein the polytetrafluoroethylene paste is adhered on an outer circumferential face of the pole of the screw.

20. The electronic device of claim 14, wherein the electronic device is a storage bridge bay canister.

* * * * *